(12) United States Patent
Ogawa (10) Patent No.: US 9,754,279 B2
(45) Date of Patent: Sep. 5, 2017

(54) ADVERTISING CAMPAIGNS UTILIZING STREAMING ANALYTICS

(75) Inventor: Stuart Ogawa, San Jose, CA (US)

(73) Assignee: Excalibur IP, LLC, New York, NY (US)

(*) Notice: Subject to any disclaimer, the term of this patent is extended or adjusted under 35 U.S.C. 154(b) by 0 days.

(21) Appl. No.: 13/283,091

(22) Filed: Oct. 27, 2011

(65) Prior Publication Data

US 2013/0110638 A1  May 2, 2013

(51) Int. Cl.
*G06Q 30/00* (2012.01)
*G06Q 30/02* (2012.01)

(52) U.S. Cl.
CPC .................. *G06Q 30/0241* (2013.01)

(58) Field of Classification Search
USPC .......................................... 705/14
See application file for complete search history.

(56) References Cited

U.S. PATENT DOCUMENTS

| | | |
|---|---|---|
| 7,774,715 B1 | 8/2010 | Evans |
| 2003/0074252 A1 | 4/2003 | Chandler-Pepelnjak et al. |
| 2004/0172343 A1* | 9/2004 | Allibhoy et al. ............... 705/27 |
| 2006/0031107 A1 | 2/2006 | Aihara et al. |
| 2006/0230029 A1* | 10/2006 | Yan .................................. 707/3 |
| 2006/0253327 A1 | 11/2006 | Morris et al. |
| 2007/0005419 A1* | 1/2007 | Horvitz et al. ................. 705/14 |
| 2007/0028263 A1 | 2/2007 | Collins |
| 2008/0091537 A1 | 4/2008 | Miller et al. |
| 2008/0103897 A1 | 5/2008 | Flake et al. |
| 2008/0235089 A1 | 9/2008 | Weyer et al. |
| 2008/0255915 A1 | 10/2008 | Collins et al. |
| 2008/0262964 A1 | 10/2008 | Bezos et al. |
| 2009/0063268 A1 | 3/2009 | Burgess et al. |
| 2009/0299817 A1 | 12/2009 | Fok et al. |
| 2010/0228582 A1 | 9/2010 | King et al. |
| 2011/0202404 A1 | 8/2011 | van der Riet |
| 2011/0231243 A1 | 9/2011 | Bhatia et al. |
| 2011/0238474 A1 | 9/2011 | Carr et al. |
| 2011/0238486 A1 | 9/2011 | Liu et al. |
| 2011/0239246 A1 | 9/2011 | Woodward et al. |

(Continued)

FOREIGN PATENT DOCUMENTS

| | | |
|---|---|---|
| CN | 101689273 A | 3/2010 |
| TW | 201011666 A | 3/2010 |

OTHER PUBLICATIONS

U.S. Appl. No. 13/091,784, filed Apr. 21, 2011, Ogawa.

(Continued)

*Primary Examiner* — Alvin L Brown
(74) *Attorney, Agent, or Firm* — Mauriel Kapouytian Woods LLP; Andrew A. Noble; James Woods (57) ABSTRACT

The present invention provides methods and systems for use in advertising campaigns and advertisement targeting. Techniques are provided in which streams of data, including communications data, are sampled, such as during transmission to intended recipients. Sampled data may be analyzed and used to determine topics of interest. Sampled data may be analyzed or filtered to determine data suspected of being of particular significance or relevance in determining topics of interest. Determined topics of interest may be used in advertisement targeting as part of an advertising campaign.

20 Claims, 5 Drawing Sheets

(56) References Cited

U.S. PATENT DOCUMENTS

| | | |
|---|---|---|
| 2012/0036009 A1 | 2/2012 | Aronowich et al. |
| 2012/0041792 A1 | 2/2012 | Priyadarshan et al. |
| 2012/0059707 A1 | 3/2012 | Goenka et al. |
| 2012/0066065 A1 | 3/2012 | Switzer |
| 2012/0084125 A1 | 4/2012 | Chan et al. |
| 2012/0084141 A1 | 4/2012 | Quinn et al. |
| 2012/0089455 A1 | 4/2012 | Belani et al. |
| 2012/0130813 A1* | 5/2012 | Hicken et al. ............. 705/14.54 |
| 2012/0158485 A1 | 6/2012 | Ogawa |
| 2012/0158486 A1 | 6/2012 | Ogawa |
| 2012/0158487 A1 | 6/2012 | Ogawa |
| 2012/0253977 A1 | 10/2012 | Mesaros |

OTHER PUBLICATIONS

U.S. Appl. No. 13/092,267, filed Apr. 22, 2011, Ogawa.
U.S. Appl. No. 13/220,474, filed Aug. 29, 2011, Ogawa.
U.S. Appl. No. 13/595,303, filed Aug. 27, 2012, Ogawa.
International Search Report and Written Opinion issued in International Application No. PCT/US2011/062252 dated Jun. 27, 2012.
International Search Report and Written Opinion issued in International Patent Application No. PCT/US2012/049957 dated Jan. 31, 2013.
Office Action issued in Taiwanese Patent Application No. 100143266 dated Aug. 20, 2014.
Office Action issued in Taiwanese Patent Application No. 101129675 dated Aug. 15, 2014.

* cited by examiner

ADVERTISING CAMPAIGNS UTILIZING STREAMING ANALYTICS

BACKGROUND

Effectively spending advertising dollars, from the advertiser executive perspective, is a challenging problem. Furthermore, even an otherwise sound advertising campaign can be rendered ineffective by incorrect, delayed, or late to market timing, and even very small delays can render a campaign and its elements much less effective. This is particularly true as mobile devices, across the globe, are used to create and transmit real-time data. Mobile users may create and transmit data at a materially faster rate than existing advertising platforms can effectively intake, absorb, and process in a timely, relevant and targeted manner, from a campaign perspective.

There is a need for more effective techniques in advertising and advertising campaigns.

SUMMARY

Some embodiments of the invention provide systems and methods for use in advertising campaigns, including advertisement targeting. Techniques are provided in which streams of data, including, for example, communications data, metadata, geo data, temporal data, etc., is sampled, such as during transmission to intended recipients. Sampled data may be analyzed and used to determine topics of interest. Sampled data may be analyzed or filtered to determine data suspected of being of particular significance or relevance in determining topics of interest. Determined topics of interest may subsequently be used in advertisement targeting as part of an advertising campaign.

While the invention is described with reference to the above drawings, the drawings are intended to be illustrative, and the invention contemplates other embodiments within the spirit of the invention.

DETAILED DESCRIPTION

Figure 1:
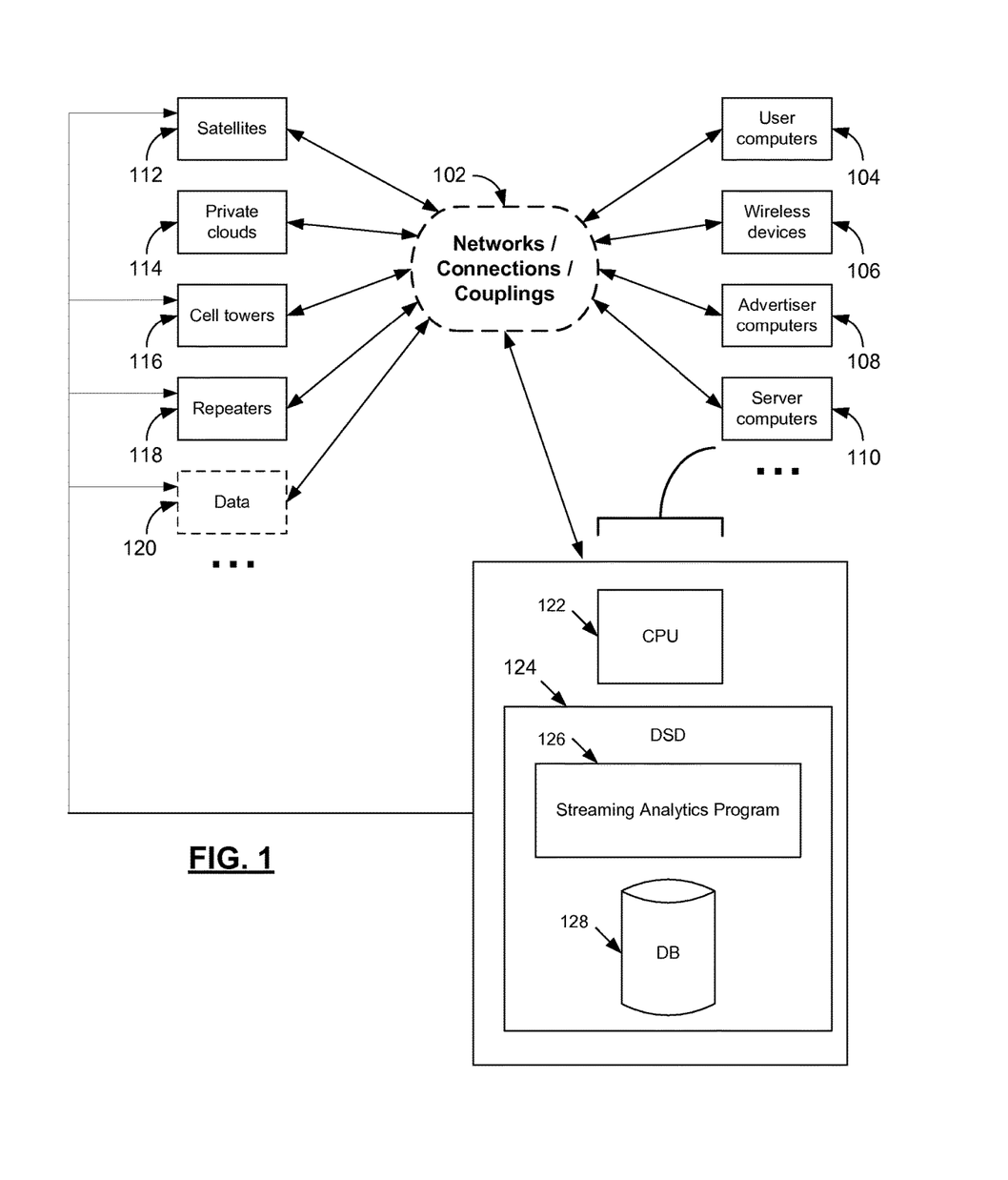
FIG. 1 is a distributed computer system according to one embodiment of the invention.

FIG. 1 is a distributed computer system 100 according to one embodiment of the invention. The system 100 includes or utilizes various computers and electronic devices. As depicted, the system includes user computers 104, wireless devices 106, advertiser computers 108, and server computers 110.

Furthermore, the system can include or utilize any of numerous other distributed components. As depicted, these may include satellites or satellite systems 112, clouds such as private clouds 114, cell towers and related systems 116, repeaters 118, intermediary service providers, and various forms of data 120.

Any of the various components of the system 100 may be coupled or networked together in various ways, which may include allowing bidirectional communication and data flow. Various networks and types of networks may be included or utilized, which may include telephone networks, the Internet, wired and wireless networks, public and private networks and clouds, etc. embodiments in which the Internet is not included, as well as embodiments in which other networks are included in addition to the Internet, including one more wireless networks, WANs, LANs, telephone, cell phone, or other data networks, networks associated with satellites, repeaters, intermediary service providers, etc. Furthermore, embodiments are contemplated in which user computers or other devices may be or include wireless, portable, or handheld devices such as cell phones, smart phones, PDAs, tablets, etc.

Furthermore, while not depicted some embodiments of the invention include one or more electronic data sampling devices or systems, as well as other systems, devices, and components. Such devices or systems may be separate or standalone, or may be integrated into other computers or devices. Furthermore, such devices and systems may be coupled, such as through one or more networks, to other computers and devices, including the server computers, the advertiser computers, etc.

Each of the computers may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, sampling, search results, and advertising, such as graphical or banner advertising as well as keyword searching and advertising in a sponsored search context. Many types of advertisements are contemplated, including textual advertisements, rich advertisements, video advertisements, coupon-related advertisements, group-related advertisements, social networking-related advertisements, network gaming ads, virtual world ads, user-contributed content or video, etc.

As depicted, each of the server computers 110 includes one or more CPUs 122 and a data storage device 124. The data storage device 124 includes a database 128 and Streaming Analytics Program 126.

As depicted, the server computer, 110, including the Streaming Analytics Program 126, are coupled directly to various sources of data, which may include streaming or real-time data, including, for example, perhaps among others, satellites 112, cell towers 116, repeaters 118 and other data 120 or data sources, which may include other elements of the system 100, or non-depicted or other elements. While the server computer 110 is depicted as coupled to the data sources, in some embodiments, a streaming analytics program or streaming analytics system may otherwise be directly so coupled.

In some embodiments, direct or otherwise fast, efficient connection or coupling of the Streaming Analytics Program 126 to various data sources eliminates, reduces, mitigates or collapses latency or ad-related latency inherent in other arrangements. For example, ad latency increases when a data source first transmits data, which consequently goes through a network or networks, then arrives at an analytics system or program. By contrast, according to some embodiments of the invention, direct connection of the Streaming Analytics Program 126 to data sources eliminates or reduces such latency, allowing significant immediate and downstream advantages in advertising, such as, for example, faster identification of relevant ad topics, faster ad selection, faster ad delivery and campaign implementation, and, consequently, increased timeliness, relevance, or ad performance, increased campaign performance and ROI, etc.

The Program 114 is intended to broadly include all programming, applications, algorithms, software and other and tools necessary to implement or facilitate methods and systems according to embodiments of the invention. The elements of the Program 114 may exist on a single server computer or be distributed among multiple computers or devices.

Figure 2:
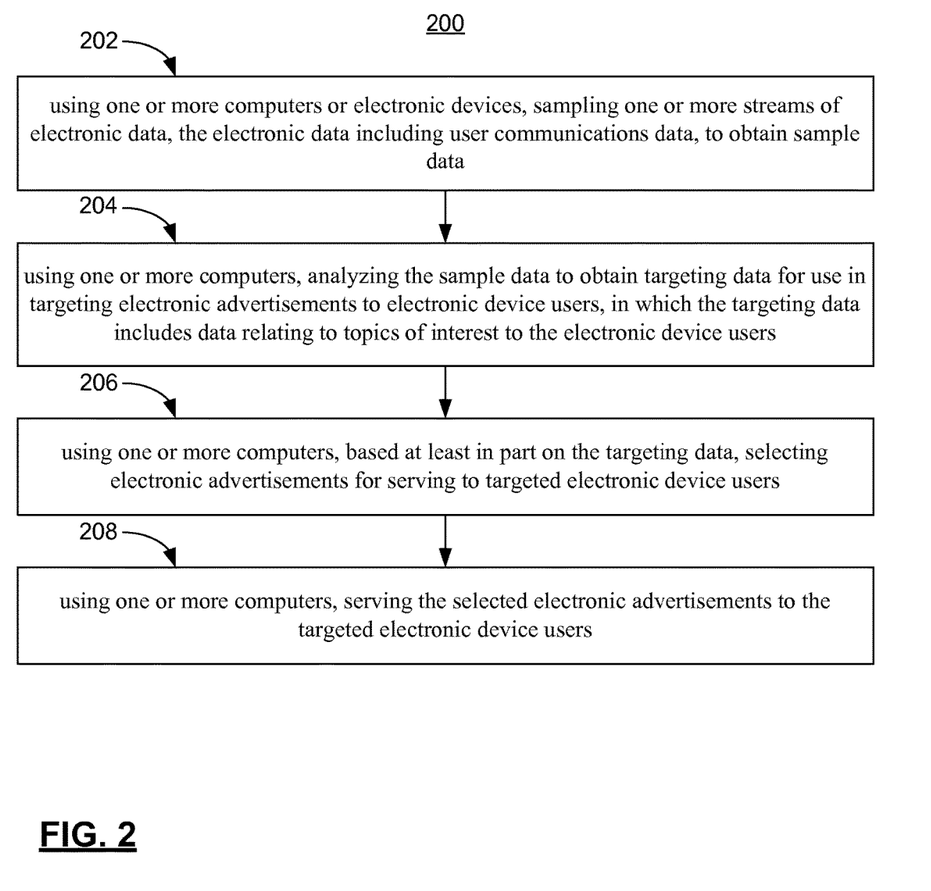
FIG. 2 is a flow diagram illustrating a method according to one embodiment of the invention.

FIG. 2 is a flow diagram illustrating a method 200 according to one embodiment of the invention. At step 202, the method 200 includes using, one or more computers or electronic devices, sampling one or more streams of electronic data, the electronic data including user communications data, to obtain sample data. Communications data or electronic data can broadly include data such as voice data, messaging data, email data, text data, blog data, content data, user generated content, analog data, digital data, user-generated content data, metadata, geo data, temporal data, etc.

It is to be noted that, in some embodiments, multiple sampling techniques or processes, or types of sampling techniques or processes, may be utilized, and may be performed serially, concurrently or in a compound manner (both serially and concurrently). Additionally, multiple testing or analytics techniques or processes may be run on sampled data, which also may be run serially, concurrently or in a compound manner.

At step 204, the method 200 includes, using one or more computers, analyzing the sample data to obtain targeting data for use in targeting electronic advertisements to electronic device users, in which the targeting data includes data relating to topics of interest to the electronic device users. Some embodiments, it is noted, do not include identifying topics of interest.

At step 206, the method 200 includes, using one or more computers, based at least in part on the targeting data, selecting electronic advertisements for serving to targeted electronic device users.

At step 208, the method 200 includes, using one or more computers, serving the selected electronic advertisements to the targeted electronic device users.

Figure 3:
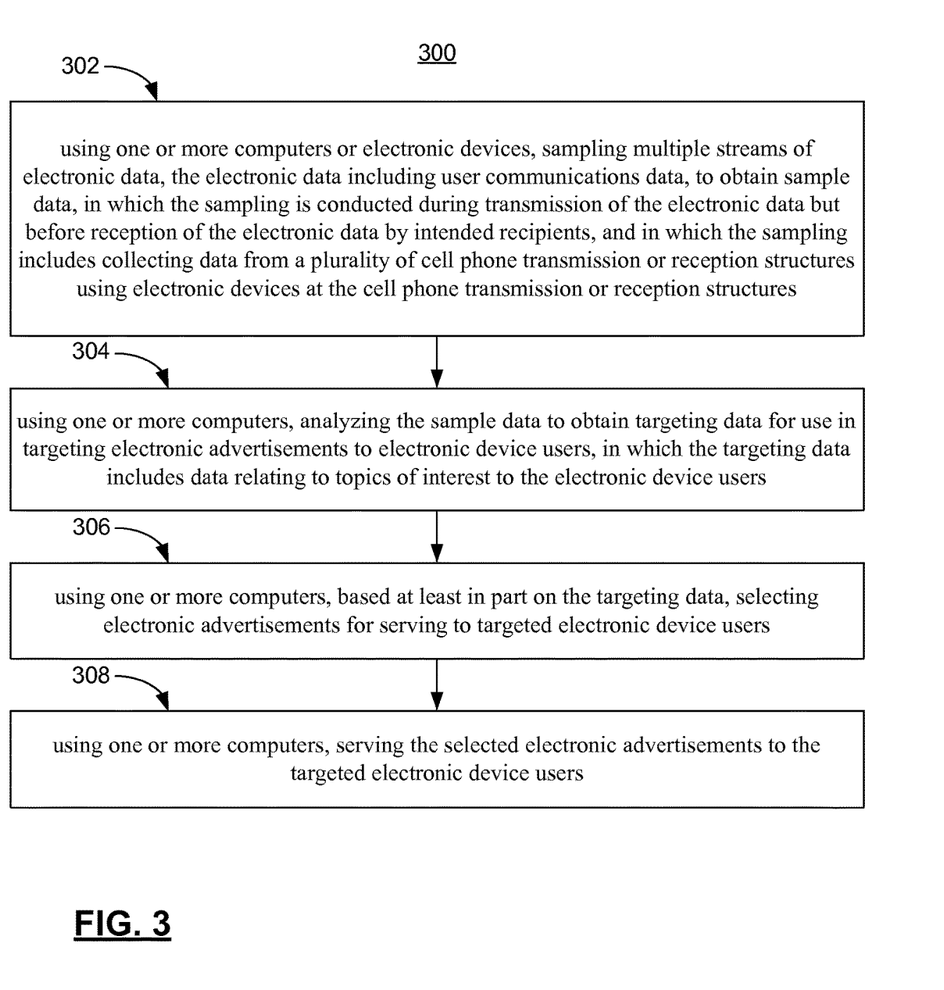
FIG. 3 is a flow diagram illustrating a method according to one embodiment of the invention.

FIG. 3 is a flow diagram illustrating a method 300 according to one embodiment of the invention. At step 302, the method 300 includes, using one or more computers or electronic devices, sampling multiple streams of electronic data, the electronic data including user communications data, to obtain sample data. The sampling is conducted during transmission of the electronic data but before reception of the electronic data by intended recipients. Sampling includes, but is not limited to, collecting data from a plurality of data sources, such as cell phone transmission or reception structures, using electronic devices at the cell phone transmission or reception structures, traditional connected transmission channels, etc. It is to be noted that, in some embodiments, a plurality of sampling techniques can be applied to the same data as the data is transmitted from the data source.

Steps 304, 306 and 308 are similar to steps 204, 206 and 208 as depicted in FIG. 2

Figure 4:
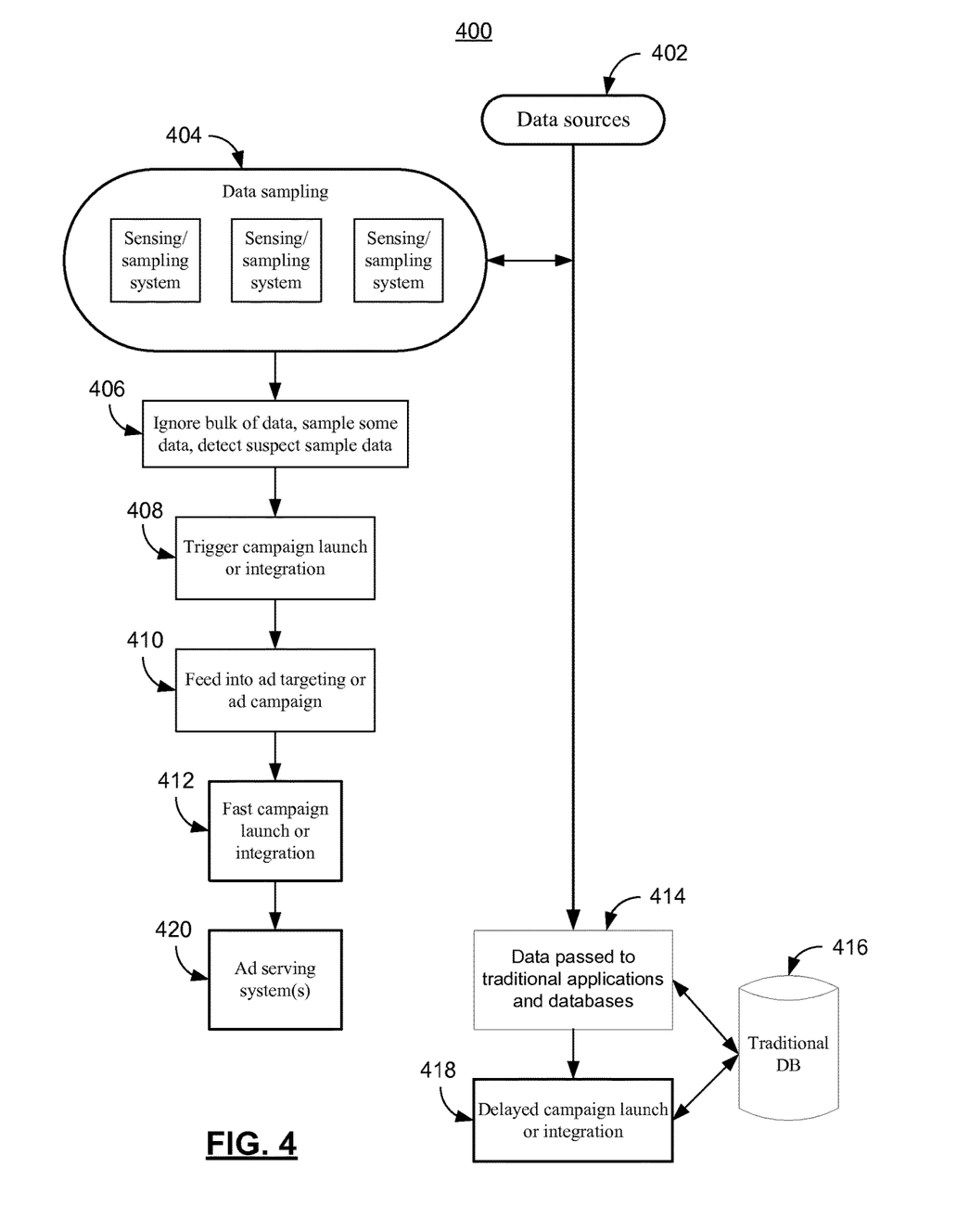
FIG. 4 is a block diagram illustrating one embodiment of the invention.

FIG. 4 is a block diagram 400 illustrating one embodiment of the invention. Block 402 represents one or more data sources or data streams. Data sources, among other things, cellular towers, voice and data repeaters, cloud computing centers, publishers, content providers, various electronic communications, etc.

Block 404 represents data sampling, including use of one or more sensing or sampling systems. It is to be noted that, in some embodiments, one or more sampling systems or sampling algorithms may be utilized, or a combination of sampling algorithms may be utilized. Furthermore, in some embodiments, a set or library of sampling algorithms may be utilized and one or more sampling algorithms may be selected therefrom.

At block 406, although the bulk of data is filtered and not sampled, some data is sampled. Furthermore, from the sampled data, suspect data is identified, which may be, for example, data suspected of being or determined to be of particular significance or relevance in user targeting. For some simple examples, suspect data can be data that matches one or more keywords from a set, such as keywords that are likely to relate to user interests, keywords associated with possible advertisement topics, etc. In some embodiments, all sample data may be utilized, and suspect data may not be identified among sample data.

At block 408, advertising campaign launch or integration is triggered, and, at block 410, sample or suspect data, or results of analysis thereof, is fed into an advertising campaign or advertisement targeting system(s). For example, these blocks can include, upon sufficient collection, or collection and analysis, of sample or suspect data, using such sample or suspect data, or the results of analysis of such data, triggering implementation of an ad campaign in which it will be used in ad targeting, or to trigger integration into an ad campaign. In various embodiments, sample or suspect data may be analyzed before triggering, feed in or integration into an ad campaign, or may be analyzed as part of an inventive component of such a campaign, for example. Some embodiments include integration with existing ad campaigns, including trafficking, analytics, billing, forecasting, targeting, ad selection, etc.

Block 412 represents near real-time or real-time use of sample or suspect data, or results of analysis thereof, in an ad campaign, such as in ad targeting.

Block 420 represents one or more ad serving systems, which may be used in serving ads and implementing ad campaigns.

Blocks 414, 416 and 418 represent prior art usage of data not including techniques according to embodiments of the invention. Specifically, at block 414, data is passed to traditional applications and databases, such as database 416. At block 418, use of such traditional techniques results in delayed campaign usage or launch.

Figure 5:
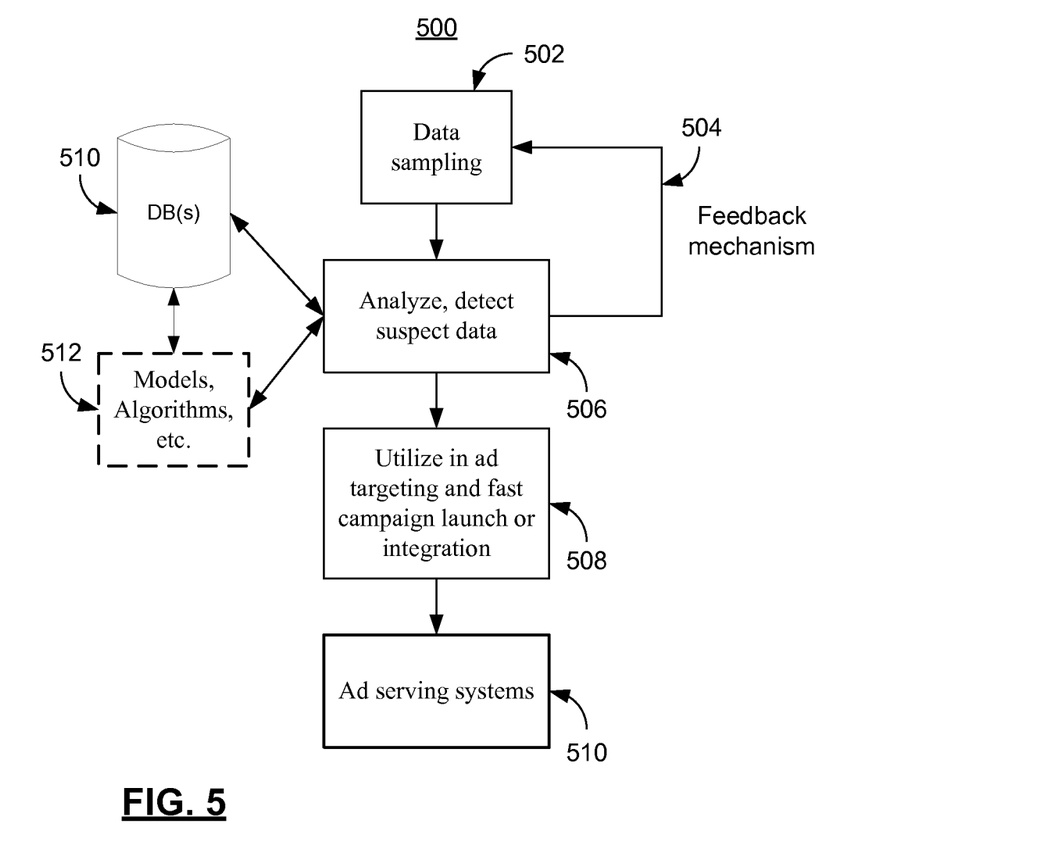
FIG. 5 is a block diagram illustrating one embodiment of the invention.

FIG. 5 is a block diagram 500 illustrating one embodiment of the invention. Block 502 represents sampling, such as sampling of data from a data stream.

Block 506 represents analysis of sample data, which can include identification of suspect data. In embodiments, a feedback mechanism 504 is utilized, in which sample analysis or suspect data identification results can be used to modify influence or guide future sampling, or sampling protocol or procedures. For example, once suspect data, or a sufficient concentration or frequency of suspect data, etc., is found, the feedback mechanism, which may include models, algorithms, engines, etc., may call for, as an example, more frequent sampling for a period thereafter, since it may be that more suspect data is likely to be found during such a period. Such analysis, identification and feedback mechanism can include use of data from one or more databases or data stores, such as database 510, as well as one or more models or algorithms 512, which can include predictive models, machine learning models, etc.

Block 510 represents one or more ad serving systems, which may be utilized in serving ads and implementing ad campaigns. This may include ad hoc, dynamic or on the fly ad generation or selection, including streaming ads or media, based on fast or real-time data sampling and associated analytics or algorithm output.

Some embodiments of the invention provide systems and methods that facilitate low to zero latency automated advertising campaigns using real-time data sensing, sampling, and detecting methods applied to data being created or data in transit. Systems according to some embodiments may increase advertiser revenue, such as by enabling the advertiser to launch automated, "first to advertise" campaigns well in advance of competitors. Systems according to some embodiments use a collection of methods including, but not limited to, sensors, filters, sampling techniques, and predictive modeling engines, for example.

Some embodiments include a recognition that effectively or optimally spending advertising dollars, from the advertiser executive perspective, can be a difficult and challenging problem. Furthermore, spending advertising dollars on an otherwise good campaign with good content can none the less result in an ineffective or low ROI campaign if the timing is incorrect or too slow. Late to market timing can be an enormous problem, particularly as more mobile devices, across the globe, are used to create and transmit real-time data. Mobile users are creating and transmitting, which can include broadcasting, data at a materially faster rate than existing advertising platforms generally can intake, absorb, and process in a timely, relevant and optimal manner, from a targeting and campaign perspective. Some embodiments of the invention reduce the time, such as to near-zero duration latency, such as by launching or enabling segmented and targeted campaigns as increasingly large scale and speed data streams, or "Big Data" streams, are occurring. For example, some embodiments, enable, help enable, or launch extremely fast to market and optimized targeted advertising campaigns based on real-time data, such as cell phone communications, social networking blogs or feeds, etc.

Some embodiments include a recognition that obtaining relevant insights using existing systems and methods against the increasingly large Big Data streams is no longer generally viable. Existing advertising systems may take too much time to load relevant Big Data, such as user and audience data, analyze the data, give insights for advertisers to make decisions, and, finally, to launch campaigns based on these this sequential or waterfall processing and time intensive processes. This can result in too many or too slow steps, which take too much time to launch or help with a real-time, optimally targeted campaign.

Some embodiments provide new and real-time or near real-time approaches to detect, sample, and launch timely campaigns based upon real-time data being created or transmitted. This can enable the advertiser the ability to launch, or have launched on the advertiser's behalf, relevant and targeted campaigns far sooner than competitors who use traditional methods to load and analyze data in a database for campaign launch, targeting and operationalization.

Some embodiments provide a real-time sampling, sensing, and detection system capable of launching low latency advertising campaigns, allowing near-instantaneous campaigns based on data just being created and or just being transmitted.

Some embodiments provide techniques including a collection of methods and subsystems using hardware, software, databases, and modern communication methods that integrate into existing data related systems such as cell phone transmission and reception structures (broadly including towers, repeaters, etc.), clouds and cloud computing systems, databases, or applications, for example. Furthermore, some embodiments include use of real-time systems and methods, such as real-time filters, sensors, digital processing, and analytics, to name a few methods, to sample for relevant, real-time, suspect target data, which suspect data can include data that is suspected of or identified as being of particular significance or relevance in determining topics of interest to electronic device users. Still further, some embodiments also use real-time systems and methods, such as real-time filters, sensors, digital processing, and analytics, to name a few methods, to ignore the bulk of real-time data. Additionally, some embodiments use real-time systems and methods, such as real-time filters, sensors, digital processing, and analytics, for example, to filter, amplify, correlate and, examine suspect data and identify or generate desirable targeting data, which may be, for example, relevant or particularly relevant to a publisher or advertiser, for example. Some embodiments further include triggering or activation, or messaging relating to or leading to triggering or activation, of real-time advertising campaigns.

Some embodiments include components, systems or devices that can be placed in any of various physical or conceptual places in the data creation, data intermediary and overall transmission chain. In some embodiments, subsystems can be placed in multiple distributed locations, and a central controlling system can be used to monitor all subsystems, to perform massive and scalable data detection, campaign launching, etc. This can improve data detection accuracy and improve global campaign targeting, for example.

Some embodiments include systems that can identify real-time gaps in global communication, known as imperfect information distributions, such as by monitoring data streams and stream activity levels, and exploit these imperfect distribution gaps to a publisher or advertiser's advantage, for example.

Big Data creation and transmission, which can occur prior to Big Data being traditionally captured and stored, is becoming increasingly large and more complex as more data sources are creating and transmitting data. Traditional processes, which may involve capturing Big Data and then running advertising campaigns and or running analytics against Big Data to provide segmented and targeted campaigns, have already reached a sunset stage in terms of capability and maturity.

Some embodiments provide systems and methods that enable advertisers to increase topline revenue by creating campaigns fast enough to accommodate the speed of user data creation and transmission, as opposed to steps including waiting for the data to be received by a publisher, then performance of analytics in order to gain insights, and then the running of campaigns. With traditional techniques, the first-mover opportunity and revenue, in terms of time, can be lost.

Some embodiments include use of sophisticated digital and analog techniques, applied to real-time data processing well into the early data creation and transmission stream and data life cycle, giving advertisers and publishers unprecedented marketing speed advantages.

One Chief Marketing Officer, or CMO, ideal goal is to create the perfect advertising campaign by defining an ideal customer profile and surgically targeting only audiences that match ideal customers. This perfect, albeit a utopia, state of alignment, increases advertiser's revenue, increases advertising campaign ROI, and reduces ad campaign expenses on campaigns targeting the incorrect audiences as the alignment gap decreases. Providing the right ad campaign at the earliest possible and most relevant time can help the CMO increase revenue, including providing the right ad at the right time, such as real-time or near real-time.

Some embodiments enable advertisers to take immediate campaign action (or take campaign action without advertiser action) as data is being created and or transmitted.

Some embodiments include allowing publishers and content providers to sell premium "first to act" service levels, increasing revenue and allowing positive differentiation from competitors.

Some embodiments reduce the time it takes for publishers and content providers to gain insights and consequently provide premium information services which command premium incremental revenue streams, in a sense providing high-speed intelligence.

Techniques according to embodiments of the invention can be implemented utilized various topologies, to globally scale into an integrated number of installations such as cell towers, publishers and content provider servers, clouds, data centers, and others.

While the invention is described with reference to the above drawings, the drawings are intended to be illustrative, and the invention contemplates other embodiments within the spirit of the invention.

The invention claimed is:

1. A computerized method comprising:
    sampling one or more streams of electronic data, the electronic data comprising user communications data, to obtain sample data, wherein sampling the streams of electronic data comprises real-time sampling, sensing, and detection of user communications data comprising user-generated content data streams that are in transmission to, but not yet received by, intended recipients;
    analyzing the user-generated content data streams in the sample data to obtain targeting data for use in targeting electronic advertisements to electronic device users, wherein the targeting data comprises data relating to topics of interest to the electronic device users;
    based at least in part on the analyzing of the user-generated content data streams in the sample data, increasing one or more sampling frequencies or rates during at least one period based on a determination that targeting data is more likely to be concentrated during the at least one period than during other periods, wherein the increasing of the one or more sampling frequencies or rates is determined by utilizing one or more analytic correlation applications in detecting patterns, and wherein the patterns can include time-based or frequency-based patterns associated with the user-generated content data streams;
    based at least in part on the targeting data obtained, selecting electronic advertisements for serving to targeted electronic device users; and
    serving the selected electronic advertisements to the targeted electronic device users, the serving including causing an advertisement serving system to initiate or modify an automated advertising campaign that includes the selected electronic advertisements.

2. The method of claim 1, wherein the sampling comprises monitoring, at one or multiple locations, multiple streams of electronic data during transmission of the data.

3. The method of claim 1, wherein one or multiple sampling techniques can be applied to one or multiple data streams.

4. The method of claim 1, wherein the sampling comprises monitoring one or more streams of electronic data during transmission of the data but before reception by intended recipients, wherein the one or more streams can come from one geographic location or from multiple geographic locations.

5. The method of claim 2, wherein the sampling comprises sampling one or more streams of electronic data at one or more cell phone transmission or reception structures.

6. The method of claim 2, wherein the sampling may be obtained from any of repeaters, computing systems, satellites, transmission systems, or receiving systems, and wherein the sampling may include any of video data, audio data, voice data, gaming data, social networking data, or blog data.

7. The method of claim 2, wherein the sampling comprises sampling one or more streams of electronic data from a cloud computing database or cloud computing data center, and wherein the sampling comprises sampling a plurality of streams from disparate geographic locations.

8. The method of claim 1, comprising sampling data from a plurality of data streams, and comprising integrating data from the various data streams.

9. The method of claim 1, wherein the sampling comprises intercepting sample data but not intercepting non-sample data, and wherein the sampling comprises intercepting sample data from a plurality of data modes, wherein the data modes may comprise any of voice, audio, video, gaming, social network or blogging.

10. The method of claim 9, comprising sampling data at one or more intervals, wherein the one or more intervals may be determined based on one or more parameters or one or more algorithms, and where the one or more parameters or one or more algorithms may include or incorporate any of sampling time, sampling frequency, or sampling data analytics.

11. The method of claim 9, comprising analyzing the sample data to identify suspect data, wherein the suspect data is data suspected of or identified as being of particular significance or relevance in determining topics of interest to electronic device users.

12. The method of claim 11, comprising increasing one or more sampling frequencies or rates during periods during which it is determined that suspect data is more likely to be identified than other periods, and wherein determining sampling frequencies or rates comprising utilizing one or more analytic correlation applications in detecting patterns, and wherein the patterns can include time-based or frequency-based patterns.

13. The method of claim 12, wherein the sampling comprises sampling data from a plurality of geographically distributed locations using a plurality of sampling systems.

14. The method of claim 1, wherein the sampling takes place at a same location as a data source or on a same data source system as a data source.

15. A system comprising:
    one or more server computers coupled to a network; and
    one or more databases coupled to the one or more server computers;
    wherein the one or more server computers are configured to:
        analyze sample data to obtain targeting data for use in targeting electronic advertisements to electronic device users, wherein the targeting data comprises data relating to topics of interest to the electronic device users, wherein the sampling data is obtained by sampling one or more streams of electronic data, the electronic data comprising user communications data, wherein sampling the streams of electronic data comprises real-time sampling, sensing, and detection of user communications data comprising user-generated content data streams that are in transmission to, but not yet received by, intended recipients;

based at least in part on the analyzing of the user-generated content data streams in the sample data, increase one or more sampling frequencies or rates during at least one period based on a determination that targeting data is more likely to be concentrated during the at least one period than during other periods, wherein the increasing of the one or more sampling frequencies or rates is determined by utilizing one or more analytic correlation applications in detecting patterns, and wherein the patterns can include time-based or frequency-based patterns associated with the user-generated content data streams;

based at least in part on the targeting data obtained, select electronic advertisements for serving to targeted electronic device users; and serve the selected electronic advertisements to the targeted electronic device users, the serving including causing an advertisement serving system to initiate or modify an automated advertising campaign that includes the selected electronic advertisements.

16. The system of claim 15, wherein the sampling comprises monitoring one or more streams of electronic data during transmission of the data.

17. The system of claim 15, wherein the sampling comprises monitoring one or more streams of electronic data during transmission of the data and before reception of the data to intended recipients.

18. The method of claim 15, wherein the sampling comprises sampling one or more streams of electronic data via one or more devices installed at one or more cell phone transmission or reception systems.

19. The method of claim 15, wherein the sampling comprises sampling one or more streams of electronic data from a cloud computing system or cloud, and wherein the streams of data can include any of voice data, video data, voice data, audio data, gaming data, social network data, or blog data.

20. A non-transitory computer readable storage medium or media having stored instructions thereon for causing a computer to execute a method, the method comprising:

sampling a plurality of streams of electronic data, the electronic data comprising user communications data, to obtain sample data, wherein the sampling is conducted during transmission of the electronic data but before reception of the electronic data by intended recipients, wherein sampling the streams of electronic data comprises real-time sampling, sensing, and detection of user communications data comprising user-generated content data streams that are in transmission to, but not yet received by, intended recipients, and wherein the sampling comprises collecting data from a plurality of systems, wherein such systems include one or more wireless transmission systems, using electronic devices at the systems;

analyzing the user-generated content data streams in the sample data to obtain targeting data for use in targeting electronic advertisements to electronic device users, wherein the targeting data comprises data relating to topics of interest to the electronic device users;

based at least in part on the analyzing of the sample data, increasing one or more sampling frequencies or rates during at least one period based on a determination that targeting data is more likely to be concentrated during the at least one period than during other periods, wherein the increasing of the one or more sampling frequencies or rates is determined by utilizing one or more analytic correlation applications in detecting patterns, and wherein the patterns can include time-based or frequency-based patterns associated with the user-generated content data streams;

based at least in part on the targeting data obtained, selecting electronic advertisements for serving to targeted electronic device users; and serving the selected electronic advertisements to the targeted electronic device users, the serving including causing an advertisement serving system to initiate or modify an automated advertising campaign that includes the selected electronic advertisements.

* * * * *